United States Patent [19]
Cross

[11] 3,752,013
[45] Aug. 14, 1973

[54] POWER TRANSMISSION HAVING A HYDROSTATIC DRIVE COMBINED WITH A HYDRODYNAMIC DRIVE

[75] Inventor: Norman A. Cross, Indianapolis, Ind.

[73] Assignee: General Motors Corporation, Detroit, Mich.

[22] Filed: Apr. 26, 1972

[21] Appl. No.: 247,654

[52] U.S. Cl. .................. 74/732, 74/785, 74/794
[51] Int. Cl. ............................................ F16h 47/00
[58] Field of Search ............... 74/730, 731, 732, 74/733, 781, 783, 785, 787, 794, 720

[56] References Cited
UNITED STATES PATENTS

| | | | |
|---|---|---|---|
| 2,131,619 | 9/1938 | Daffield | 74/787 |
| 2,324,733 | 7/1943 | Smirl | 74/720 X |
| 2,326,570 | 8/1943 | Schaefer et al. | 74/781 R |
| 2,899,844 | 8/1959 | Hattan | 74/732 X |
| 2,950,632 | 8/1960 | Miller | 74/720 |
| 3,503,281 | 3/1970 | Gsching et al. | 74/732 |

FOREIGN PATENTS OR APPLICATIONS

| 184,833 | 2/1956 | Austria | 74/732 |
|---|---|---|---|

*Primary Examiner*—Charles J. Myhre
*Assistant Examiner*—Thomas C. Perry
*Attorney*—W. E. Finken and D. F. Scherer

[57] ABSTRACT

A power transmission having a hydrostatic portion and a hydrodynamic portion. The hydrostatic portion, operable through an infinitely variable range, is combined with a planetary gear reduction unit to provide a low speed range. The hydrostatic and hydrodynamic portions are combined to provide an infinitely variable high speed range.

4 Claims, 1 Drawing Figure

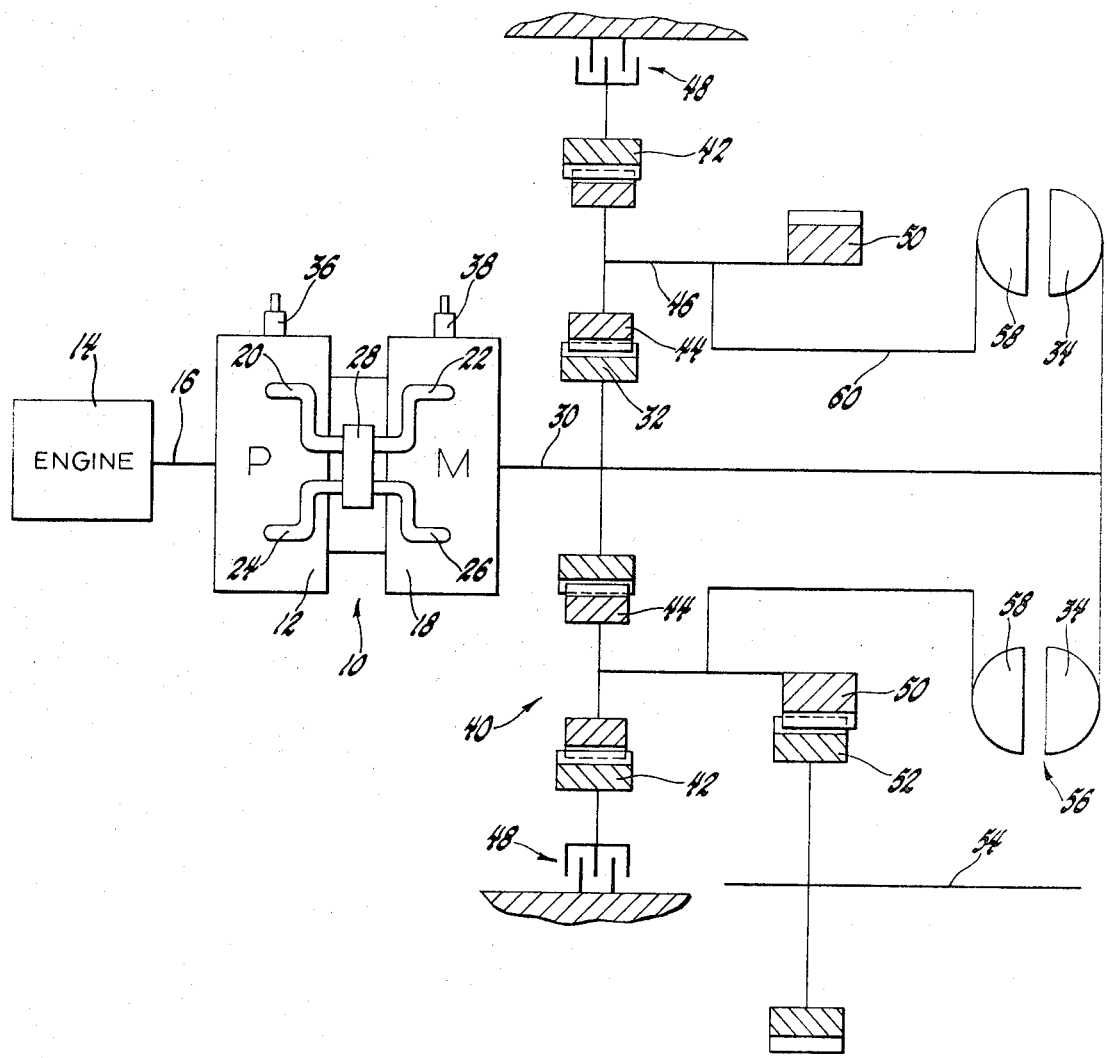

POWER TRANSMISSION HAVING A HYDROSTATIC DRIVE COMBINED WITH A HYDRODYNAMIC DRIVE

This invention relates to power transmissions and more particularly to power transmissions having two or more infinitely variable speed ranges.

The present invention includes a hydrostatic transmission having an input shaft drivingly connected to a power source and an output shaft drivingly connected to a simple planetary gear set and to the impeller or driving member of a hydrodynamic device. A low or first speed range is provided between the input shaft to the hydrostatic transmission and the output shaft of a power transmission by engaging a selectively operable fluid brake to control one member of the planetary gear set. The engagement of the brake establishes a reduction drive between the hydrostatic transmission output shaft and the power transmission output shaft. The speed ratio during the low range of operation is made infinitely variable by controlling the displacement ratio of the hydrostatic transmission. During the low speed ratio the hydrodynamic device is exhausted so that there is no fluid drive between the driving member and the turbine or driven member of the hydrodynamic device which is drive connected to the power transmission output shaft. When the upper end of the low range is reached the power transmission is conditioned for a second range drive by disengaging the brake and filling the hydrodynamic device with fluid to establish a driving relationship between the impeller and turbine members thereof. The hydrodynamic device is designed such that the maximum torque capacity of the device is equal to the maximum output torque of the hydrostatic transmission when the slip ratio of the hydrodynamic device is equal to the speed reduction in the planetary gearing arrangement. The over-all transmission ratio may also be controlled in infinitely variable speed steps in the second speed range by controlling the transmission ratio in the hydrostatic transmission and by using the inherent slip characteristics of the hydrodynamic device.

It is an object of this invention to provide in an improved power transmission an engine driven hydrostatic transmission operable to drive the power transmission output shaft through a planetary gearing arrangement in a low speed range and through a hydrodynamic device in a high speed range.

It is another object of this invention to provide an improved power transmission having a hydrostatic transmission portion selectively drivingly connectable to the power transmission output shaft through a planetary gear reduction in a first speed range and through a hydrodynamic fluid coupling in a second speed range.

These and other objects and advantages of the present invention will be more apparent from the following description and drawing which is a schematic representation of a power transmission embodying the invention.

Referring to the drawing there is shown a hydrostatic transmission generally designated 10 having a hydraulic pump 12 drivingly connected to a prime mover 14 through a transmission input shaft 16 and a hydraulic motor 18 in fluid communication with the hydraulic pump 12 via hydraulic conduits 20, 22, 24, 26 and a conventional four way directional valve 28. The directional valve 28 is operable to provide fluid communication between all of the conduits 20, 22, 24 and 26 simultaneously thus establishing a neutral condition in the hydrostatic transmission 10. The valve 28 is movable to a forward position connecting conduit 20 to conduit 22 and conduit 24 to conduit 26. The valve 28 is movable to a reverse position connecting conduits 20 and 24 to conduits 26 and 20 respectively. The hydraulic motor 18 has an output shaft 30 drivingly connected to a sun gear 32 and a hydrodynamic impeller 34. A pump 12 and motor 18 are positive displacement hydraulic units such as that shown in U. S. Pat. No. 3,274,946 issued to E. E. Simmons Sept. 27, 1966, or they may be of any conventional positive displacement hydraulic pump and motor. Both the pump 12 and motor 18 are of the variable displacement type having conventional servo mechanisms 36 and 38 respectively for controlling the displacement thereof. The displacements of the pump and motor may also be controlled in the manner described in the above-mentioned Simmons patent. The displacements of the pump 12 and motor 18 may be controlled by any known type of hydraulic, electronic, or pneumatic control or the servo controls may be manipulated manually.

The sun gear 32 is a component in a simple planetary gear set generally designated 40 which also includes a ring gear 42, a plurality of planet pinions 44 rotatably mounted on a planet carrier 46 and meshing with the sun gear 32 and the ring gear 42. The ring gear 42 is drivingly connected to a selectively operable friction brake 48 which when engaged will hold the ring gear 42 stationary. The friction brake 48 is a conventional disc type friction brake which may be controlled in any known hydraulically, electrically, pneumatically or manual manner. The carrier 46 is drivingly connected to an output drive gear 50 which meshes with an output driven gear 52 which gear 52 is drivingly connected to a power transmission output shaft 54. The power transmission output shaft 54 is drivingly connected to the drive wheels, not shown.

The impeller 34 is a component in a dump and fill type fluid coupling generally designated 56. The fluid coupling 56 also includes a turbine or driven member 58 which is drivingly connected through a hub 60 to the output drive gear 50. The dump and fill coupling 56 is a conventional dump and fill type hydrodynamic device in which the fluid used to transmit the drive from the impeller 34 to the turbine 58 is controlled such that when the coupling 56 is filled with the fluid a drive relationship is established between the impeller 34 and turbine 58 and when the coupling 56 is emptied there is no drive relationship between the impeller 34 and the turbine 58. The fluid in the coupling 56 may be controlled in a manner similar to that described in U. S. Pat. No. 2,898,738 issued to D. R. Sand et al. Aug. 11, 1959. The impeller 34 and turbine 58 are preferably designed to have straight vanes thereon. That is to say that the vanes in the impeller 34 and turbine 58 are arranged at right angles to the plane of the axis of rotation of the coupling 56. This will permit the coupling to have identical drive characteristics when the impeller is driven either forwardly or reversely.

OPERATION

For this description of operation it is assumed that the engine 14 is operating at a governed speed thereby providing a fixed input speed to the pump 12. With the engine running and the directional valve 28 in the neutral position, the brake 48 disengaged and the coupling 56 emptied, there is no drive established between the input shaft 16 and the output shaft 54, therefore, the transmission is in neutral. To establish a forward or reverse drive the brake 48 is engaged, the directional valve 28 is moved to the forward or reverse position by any conventional means, the pump 12 is adjusted to zero displacement by the servo mechanism 36 and the motor 18 is adjusted to maximum displacement by the servo mechanism 38. The servo mechanism 36 is then operated to increase the displacement of the pump 12 which will cause fluid to be delivered to the motor 18 thereby driving the hydrostatic transmission output shaft 30 which in turn will drive the output shaft 54 through the planetary gear set 40 and the final drive gears 50 and 52. As the displacement of the pump 12 is increased to a predetermined value, the speed of the hydrostatic transmission output shaft 30 and the output shaft 54 will increase accordingly. As the displacement of pump 12 is increased above the predetermined value, to the maximum displacement thereof, the displacement of motor 18 will be simultaneously decreased. This combination of displacement changes provides a further increase in the speed of output shaft 54. When the pump displacement is at a maximum value and the motor displacement has been increased to a predetermined value the speed of output shaft 54 will be at the upper end of the low speed range.

When the upper end of the low speed range is achieved the following events will occur substantially simultaneously. The brake 48 is disengaged, the pump displacement is decreased to a predetermined value, the motor displacement is increased to its maximum value and the coupling 56 is filled with fluid. This established the second range of operation for the transmission. The inherent slip condition of the coupling 56 will permit the impeller 34 to be driven at the speed of the hydrostatic transmission output shaft 30 and the turbine 58 to rotate at a speed corresponding to the speed of output shaft 54 as determined by the final drive gears 50 and 52. To increase the speed of output shaft 54 during the second range of operation the displacement of pump 12 is increased to a predetermined value after which the motor displacement is decreased simultaneously with further increase in the displacement of pump 12. When the displacement of pump 12 is adjusted to its maximum value the displacement of motor 18 is further decreased to a predetermined minimum value to establish the maximum speed of output shaft 54. During the second range of operation the slip speed in coupling 54 steadily decreases from a maximum value at the shift point to a very small value at the upper end of the second speed range. It will be appreciated from the above discussion that the low speed range is a full hydrostatic drive and the high speed range is a combined hydrostatic-hydrodynamic drive.

The maximum and minimum values established in the hydraulic pump and motor 12 and 18 are determined by the horse power output of the engine 14 and by the maximum and minimum tractive efforts required at the vehicle wheels and by the maximum vehicle speed desired. The coupling 56 is designed to provide the slip speed and torque requirements for a particular vehicle operation. The following chart provides the displacement values and hydrostatic system pressure which are used for a 2,100 rpm governed engine having a maximum of 400 horse power output when the transmission is used in a vehicle having a gross vehicle weight of 89,350 pounds. The gear ratio in the planetary gear set 40 with the brake 48 engaged is 3.7:1.

POWER TRANSMISSION
TWO RANGE–SINGLE FLOW PATHS
FIRST AND SECOND RANGE OPERATION

| Vehicle speed mph | Wheel torque | Hydraulic motor speed | Hydraulic motor torque | Hydraulic motor displacement | Hydraulic system pressure | Pump displacement | Coupling speed ratio |
|---|---|---|---|---|---|---|---|
| 1st RANGE ||||||||
| 0 | 177000 | 0 | 1760 | 27 | 4925 | Leakage | |
| 2 | 177000 | 1000 | 1760 | 27 | 4925 | 12.87 | Full |
| 4 | 106000 | 2000 | 1050 | 22.8 | 3480 | 25.7 | hydro- |
| 6 | 71000 | 3000 | 700 | 18.7 | 2820 | 27 | static |
| 6.22 | 68000 | 3100 | 678 | 18.3 | 2795 | 27 | |
| 2nd RANGE ||||||||
| 6.22 | 47800 | 1200 | 1750 | 27 | 4925 | 14.7 | 0.7 |
| 10 | 35000 | 1632 | 1280 | 27 | 3580 | 21.0 | 0.823 |
| 12 | 30600 | 1884 | 1120 | 27 | 3130 | 24.2 | 0.856 |
| 14 | 26800 | 2140 | 982 | 26.5 | 2800 | 27 | 0.880 |
| 16 | 24000 | 2400 | 880 | 23.6 | 2815 | 27 | 0.898 |
| 18 | 21590 | 2658 | 790 | 21.4 | 2785 | 27 | 0.913 |
| 20 | 19670 | 2930 | 720 | 19.35 | 2810 | 27 | 0.923 |
| 23 | 17350 | 3320 | 635 | 17.2 | 2782 | 27 | 0.934 |

Obviously, many modifications and variations of the present invention are possible in light of the above teachings. It is, therefore, to be understood that within the scope of the appended claims the invention may be practiced otherwise than as specifically described.

What is claimed is:

1. A power transmission comprising an input shaft; an output shaft; a variable displacement fluid pump drivingly connected to said input shaft; a variable displacement fluid motor having a motor output shaft and being in fluid communication with said variable displacement fluid pump to be driven thereby; a planetary gear set having a sun gear drivingly connected with said motor output shaft, a carrier drivingly connected with said output shaft, a plurality of pinion gears rotatably mounted on said carrier and meshing with said sun gear, and a ring gear meshing with the pinion gears; a selectively operable brake operatively connected with said ring; and selectively operable variable capacity hydrodynamic drive means including an impeller drive connected with said sun gear and said motor output shaft and a turbine drive connected with said output shaft; whereby said variable displacement pump and motor, said brake and said planetary gear set are operable to provide a low speed range between said input and output shafts and said hydrodynamic drive is operated at a predetermined torque ratio in said fluid pump and motor and said brake is disengaged so that said variable displacement pump and motor and said hydrodynamic drive means are operable to provide a high speed range between said input and output shafts.

2. A power transmission comprising an input shaft; an output shaft; a variable displacement fluid pump drivingly connected to said input shaft; a variable displacement fluid motor having a motor output shaft and being in fluid communication with said variable displacement fluid pump to be driven thereby; a simple planetary gear set means including selectively operable brake means, said gear set means being operable when said brake is engaged to provide a reduction drive connected between said motor output shaft and said output shaft; and dump and fill hydrodynamic drive means including an impeller drive connected with said motor output shaft and a turbine drive connected with said output shaft for providing a slipping drive connection between said motor output shaft and said output shaft when said hydrodynamic drive means is filled; whereby said variable displacement pump and motor, said brake and said simple planetary gear set are operable to provide an infinitely variable hydrostatic low speed range between said input and output shafts and said hydrodynamic drive means is filled and said brake is disengaged so that said variable displacement pump and motor and said hydrodynamic drive means are operable to provide an infinitely variable hydrostatic-hydrodynamic high speed range between said input and output shafts.

3. A power transmission comprising input means; output means; variable displacement hydrostatic transmission means drivingly connected with said input means and having an output shaft, said hydrostatic transmission means being controllable to provide a variable speed ratio between said input means and the output shaft; simple planetary gear means selectively operatively drivingly connected between said output shaft and said output means to provide a hydrostatic reduction drive between said input and output means; and selectively operable fluid coupling means drivingly connected between said output shaft and said output means in parallel relation with said planetary gearing means cooperating with said hydrostatic transmission means for selectively providing a direct hydrostatic-hydrodynamic drive between said input and output means; said planetary gear means being rendered inoperable and said fluid coupling being made operable at a predetermined ratio in said hydrostatic transmission means to thereby establish a shift point between said reduction drive and said direct drive.

4. A power transmission comprising input means; output means; and infinitely variable ratio hydrostatic transmission drivingly connected to said input shaft; a planetary gear set having a sun gear drivingly connected with said hydrostatic transmission, a carrier drivingly connected with said output means, a plurality of pinion gears rotatably mounted on said carrier and meshing with said sun gear, and a ring gear meshing with the pinion gears; a selectively operable brake operatively connected with said ring; and selectively operable variable capacity hydrodynamic drive means disposed in parallel drive relation with said planetary gear set and including an impeller drive connected with said hydrostatic transmission and a turbine drive connected with said output means; said hydrostatic transmission, said brake and said planetary gear set being operable to provide a low speed reduction hydrostatic drive range between said input and output means and said hydrodynamic device being operated and said brake is disengaged so that said hydrostatic transmission and said hydrodynamic drive means are operable to provide a high speed direct hydrostatic-hydrodynamic drive range between said input and output means.

* * * * *